Oct. 16, 1923.

Re. 15,698

J. F. DOWNEY

ASH TRAY

Original Filed June 17, 1920

Inventor

John F. Downey

By Howard E. Barlow

Attorney

Reissued Oct. 16, 1923. Re. 15,698

UNITED STATES PATENT OFFICE.

JOHN F. DOWNEY, OF PROVIDENCE, RHODE ISLAND, ASSIGNOR TO UNIVERSAL ASH TRAY COMPANY, INC., OF PROVIDENCE, RHODE ISLAND, A CORPORATION OF RHODE ISLAND.

ASH TRAY.

Original No. 1,372,124, dated March 22, 1921, Serial No. 389,778, filed June 17, 1920. Application for reissue filed June 14, 1922. Serial No. 568,287.

*To all whom it may concern:*

Be it known that I, JOHN F. DOWNEY, a citizen of the United States, residing in the city of Providence, county of Providence, and State of Rhode Island, have invented certain new and useful Improvements in Ash Trays, of which the following is a specification, reference being had therein to the accompanying drawing.

This invention relates to a combined ash-tray and cigarette-extinguishing device, and has for its object to provide a simple and inexpensive device of this character which may serve as a table ornament and also as an ash tray, the same comprising a base having one or more holes in its face, of a size to receive the lighted end of a cigarette, whereby when placed therein the fire will at once be smothered and so extinguished.

A further object of the invention is the provision of a removable bushing in the bores of the base whereby the bushing which forms a cup, may be readily removed to clean and discharge the ashes therefrom.

By the use of this device any desired number of cigarette-receiving pockets may be formed in a single ash-tray or base.

The nature and advantages of the invention will be better understood when the following detailed description is taken in connection with the accompanying drawing, the invention residing in the combination and arrangement of parts as claimed.

In the drawing forming part of this specification, like numerals of reference indicate similar parts in the several views and wherein:—

Figure 1:
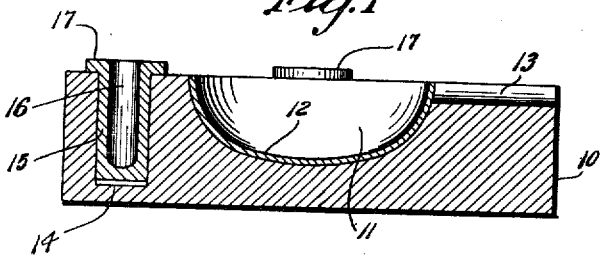
Figure 1 is a sectional elevation on line 1—1 of Figure 2, showing my improved ash-tray.

As is well known by cigarette smokers a lighted cigarette upon being laid down in a tray or elsewhere, continues to burn until the whole is consumed, which often is very objectionable and annoying particularly to the non-smokers in the room.

It is also well known that considerable manipulation is usually required in order to extinguish a lighted cigarette. Therefore it is found desirable to provide means whereby the cigarette may be readily extinguished without effort on the part of the smoker, which result is accomplished by simply placing the lighted end of the cigarette into any one of the holes provided in the base for this purpose.

With reference to the drawings, 10 designates the base member of the ash-tray or receiver, which may be formed of a block of any material and in any desired form, which block may, if desired, be provided with a central recess 11 in which is set a removable lining 12 of metal, glass or other suitable material, and this block or boss may also be provided with a plurality of radially-disposed grooves 13 which are adapted to serve as rests or supports for partially smoked cigars.

I have also shown this block as being provided with a plurality of holes 14 into each of which is set a thimble-shaped bushing 15 having a central bore 16 of substantially the diameter of a cigarette and of a suitable depth to receive and support the lighted end of a cigarette therein so that when this lighted end is deposited into this recess the fire is at once smothered and extinguished.

These bushings preferably fit loosely into the holes in the block and are provided each with a head-portion 17 whereby it may be readily removed to discharge the ashes which may collect therein. Then again this bushing is preferably made of glass or metal so that it will not burn or char by repeated contacts with the fire of the cigarette.

Figure 2:
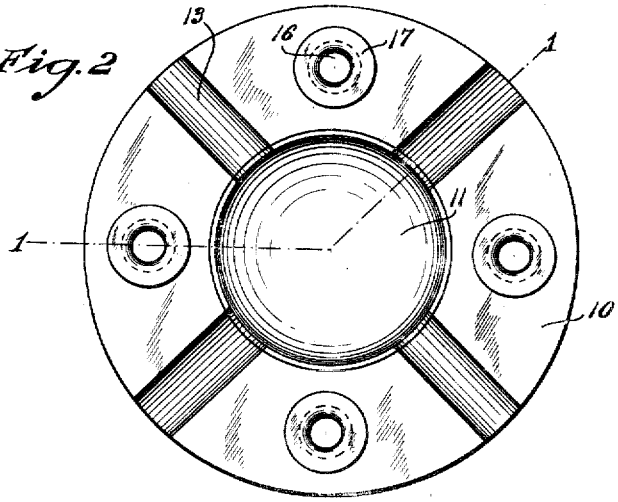
Figure 2 is a plan view of the same.
Figure 3:
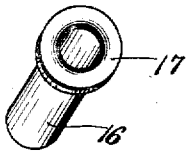
Figure 3 is a perspective view showing one of the bushings removed from the ash-tray or base.

By the use of my improved base member any number of cigarette-receiving pockets may be provided and this base may also serve as illustrated in Figure 2, for receiving ashes from cigars and pipes as well as from cigarettes.

Figure 4:
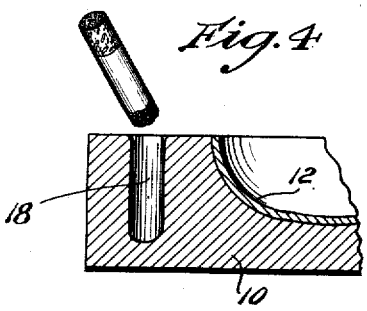
Figure 4 is a sectional view illustrating a portion of an ash-tray, showing the hole in the base portion thereof which is adapted to receive and smother the lighted end of a cigarette.

I do not wish to be restricted to the provision of a bushing placed in the holes in the base block as the bore of these holes in the block may be of a size to substantially fit a cigarette, as illustrated at 18 in Figure 4, if desired.

The device is extremely simple and inexpensive in construction and effective in its operation inasmuch as the lighted end of a cigarette may be readily positioned therein, which operation quickly chokes, smothers and extinguishes the same without further attention on the part of the user and when a thimble-shaped bushing is employed it may be made of non-inflammable material such as glass or metal to be readily removed for the purpose of discharging the ashes deposited therein.

The foregoing description is directed solely towards the construction illustrated, but I desire it to be understood that I reserve the privilege of resorting to all the mechanical changes to which the device is susceptible, the invention being defined and limited only by the terms of the appended claims.

I claim:

1. An ash tray comprising a base recessed to receive ashes and provided with a hole of a substantial depth in its face, said hole having a closed bottom portion and said hole being of a diameter to approximately fit and adapted to receive the lighted end of a cigarette so that said end will engage the bottom of the hole to smother and at once extinguish the fire therein.

2. An ash tray comprising a base provided with a bore, a readily-removable bushing fitting said bore, said bushing being of a non-combustible material and having a hole of a diameter and depth to receive and support a cigarette set endways therein to smother and extinguish its lighted end.

3. A smoker's article of the class described embracing in its construction an ash tray formed with an ash receiving recess and provided with an extinguishing socket open at its upper end and closed at its bottom, the internal diameter of said extinguisher socket being of a size approximately the diameter of a cigarette or the like whereby the lighted end of such cigarette when inserted in the socket will be cut off from the external air and become extinguished, substantially as described, 4. An ash tray formed with a recess for ashes and provided with an extinguisher socket closed at one end and open at the other end, said socket being of a diameter approximately equal to that of a cigarette or the like, substantially as described.

In testimony whereof I affix my signature in presence of two witnesses.

JOHN F. DOWNEY.

Witnesses:

HOWARD E. BARLOW,

A. F. MACREADY.

Certificate of Correction.

It is hereby certified that the assignee in Reissue Letters Patent No. 15,698, granted October 16, 1923, upon the application of John F. Downey, of Providence, Rhode Island, for an improvement in "Ash Trays," was erroneously described and specified as "Universal Ash Tray Company, Inc.," whereas said assignee should have been described and specified as *Universal Safety Ash Tray Company, Inc.*, as shown by the records of assignments in this office; and the said Letters Patent should be read with this correction therein that the same may conform to the record of the case in the Patent Office.

Signed and sealed this 27th day of November, A. D., 1923.

[SEAL.]

KARL FENNING,
*Acting Commissioner of Patents.*